(12) United States Patent
Gaubil et al.

(10) Patent No.: US 7,910,508 B2
(45) Date of Patent: Mar. 22, 2011

(54) ZIRCONIUM-BASE SINTERED PRODUCT

(75) Inventors: Michel Gaubil, Avignon (FR); Yves Boussant-Roux, Montfavet (FR); Charles McGarry, Buckhannon, WV (US); Isabelle Cabodi, Cavaillon (FR); Olivier Citti, Avignon (FR)

(73) Assignee: Saint-Gobain Centre de Recherches et d'Etudes European, Courbevoie (FR)

( * ) Notice: Subject to any disclaimer, the term of this patent is extended or adjusted under 35 U.S.C. 154(b) by 304 days.

(21) Appl. No.: 11/918,475

(22) PCT Filed: Mar. 31, 2006

(86) PCT No.: PCT/FR2006/000722
§ 371 (c)(1),
(2), (4) Date: Dec. 16, 2008

(87) PCT Pub. No.: WO2006/108945
PCT Pub. Date: Oct. 19, 2006

(65) Prior Publication Data
US 2009/0215609 A1    Aug. 27, 2009

(30) Foreign Application Priority Data

Apr. 15, 2005   (FR) ..................................... 05 03790

(51) Int. Cl.
*C04B 35/48*   (2006.01)
*C04B 35/482*  (2006.01)
(52) U.S. Cl. ........................................................ 501/106
(58) Field of Classification Search ................... 501/106
See application file for complete search history.

(56) References Cited

U.S. PATENT DOCUMENTS

| | | | | |
|---|---|---|---|---|
| 5,124,287 A | * | 6/1992 | Wehrenberg et al. | 501/106 |
| 5,502,012 A | * | 3/1996 | Bert et al. | 501/103 |
| 6,121,177 A | * | 9/2000 | Guigonis et al. | 501/105 |
| 2010/0028665 A1 | * | 2/2010 | Lu | 428/338 |
| 2010/0089098 A1 | * | 4/2010 | Citti et al. | 65/374.13 |

FOREIGN PATENT DOCUMENTS

WO    2009142695    * 11/2009

* cited by examiner

*Primary Examiner* — Karl E Group
(74) *Attorney, Agent, or Firm* — Young & Thompson

(57) ABSTRACT

The inventive sintered product is produced from an initial feedstock having a zirconium content ranging from 75 to 99% and the following average chemical weight composition, in percentage by weight, based on oxides: 60%=$ZrO_2$+$HfO_2$=75%, 27%=$SiO_2$=34%, 0.2=$TiO2$=1.5 %, 0.3<$Y_2O_3$=3.5 %, other oxides: =1%, to give a total of 100%. Said product can be used for glassworks.

20 Claims, No Drawings

ZIRCONIUM-BASE SINTERED PRODUCT

The invention relates to novel sintered materials produced from zircon, to a method of fabricating them, and to their use in a glass furnace.

Refractory products include fused cast products and sintered products.

In contrast to sintered products, fused cast products usually include a very abundant intergranular vitreous phase which fills the lattice of crystallized grains. The problems encountered in their respective applications by sintered products and by fused cast products, and the technical solutions adopted to solve them are thus generally different. Furthermore, because of the major differences in fabrication methods, a composition developed to fabricate a fused cast product cannot, a priori, be used as is in fabricating a sintered product, and vice versa.

Sintered products are obtained by mixing suitable starting materials, then shaping the green mixture, and firing the resulting green shape at a temperature and for a time sufficient to obtain sintering of the green shape.

Depending on their chemical composition and their mode of preparation, sintered products are intended for a wide variety of industries.

A priori, a sintered product adapted to a particular application will thus not have the necessary properties for use in another application in which the temperature, corrosion, or abrasion conditions are different.

As an example, United States patent U.S. Pat. No. 3,899,341 describes sintered products produced from zircon (50-90%) and zirconia. The zirconia is partially stabilized to limit elastic deformation of the products, which leads to cracking. However, the products of U.S. Pat. No. 3,899,341 are designed to be used in contact with molten steel. Thus, they are not, a priori, suitable for use in contact with a molten glass.

With sintered products, dense products produced from zircon (zirconium silicate: $ZrO_2.SiO_2$, or $ZrSiO_4$) and possibly zirconia (zirconium oxide: $ZrO_2$) may be used in applications where they are directly in contact with molten glass, in particular with non-alkaline glass.

European patent EP-A-0 952 125 thus describes sintered products intended for glass furnaces and produced from zircon (5-40%) and zirconia. Those products also contain oxides of titanium, alumina, and yttrium to allow the production of large blocks without cracks. The $SiO_2$ content of those products is less than 14%. Their $ZrO_2+HfO_2$ content is greater than 82%.

International patent application WO-A-02/44102 describes "isopipes" used to fabricate glass sheets. Isopipes comprise more than 95% by weight of zircon and their creep behavior is insufficient unless they also include between 0.2% and 0.4% of titanium oxide. To illustrate the prior art, WO-A-02/44102 cites U.S. Pat. No. 5,124,287.

U.S. Pat. No. 5,124,287 describes compositions containing 75% to 95% of zircon and titanium oxide, intended to come into contact with molten glass. It indicates that the presence of titanium oxide is favorable to densification of the products obtained after sintering. In the final product, the zirconia must be non-stabilized and it is thus preferable to use non-stabilized zirconia in the starting mixture. The use of stabilized zirconia, for example with zirconia stabilizers such as oxides of yttrium or calcium, is not a problem however, since heating the mixture results in destabilizing the zirconia.

Creep of a material under the action of a stress (compression, tension, or bending) can be defined as the capacity of a material to deform plastically, i.e. permanently, under the effect of that load. Creep of refractory ceramics is generally thermally activated, i.e. increasing the temperature tends to increase the rate of creep of the material.

In certain glass applications, in particular when shaping glass sheets, creep must be limited as far as possible since it may cause such deformation in the refractory block that it results in difficulties in complying with the dimensional specifications for the glass sheet, and in large losses for the glassmaker.

Thus, there is a need for a product with an improved creep strength that can be used in glass furnaces. The present invention aims to satisfy that need.

To this end, the invention proposes a sintered product produced from a starting charge containing 75% to 99% of zircon, and having the following mass average chemical composition, as a percentage by weight based on the oxides:

$60\% \leq ZrO_2+HfO_2 \leq 75\%$;
$27\% \leq SiO_2 \leq 34\%$;
$0.2\% \leq TiO_2 \leq 1.5\%$;
$0.3\% < Y_2O_3 \leq 3.5\%$; and
other oxides: $\leq 1\%$;
to a total of 100%.

As explained below, the sintered refractory product has improved creep strength compared with the products that have been described in the past.

Preferably, the product of the invention preferably exhibits one or more of the following optional characteristics:
- the amount of zircon in the starting charge is 80% or more, as a percentage by weight based on the oxides;
- the zirconia content is more than 5%, preferably more than 10%, and/or less than 15%, as a percentage by weight based on the oxides;
- the zirconia is at least partially stabilized by yttrium oxide, the percentage by weight of stabilized zirconia being more than 10%, preferably more than 20% of the zirconia;
- the total amount of yttrium oxide ($Y_2O_3$) is 1.7% or less and/or 0.7% or more, as a percentage by weight based on the oxides. Beyond 1.7%, the principal crystalline phases may be significantly modified, causing an increase in the rigidity of the material, or even feasibility problems.

The invention also provides a method of fabricating a sintered product, comprising the following steps:
a) mixing the starting materials to form a starting charge;
b) shaping a green part from said starting charge; and
c) sintering said green part to obtain said sintered product;
the method being remarkable in that the starting charge is determined so that said product is in accordance with the invention.

Preferably, in step a), monoclinic zirconia and/or zirconia including at least 1% of yttrium oxide, not associated with zirconia, and/or at least 1% of silica is/are added to the starting charge, the percentages being by weight based on the oxides.

Also preferably, in step a), zircon and optionally zirconia is/are added in quantities such that the total amount of zircon and zirconia represents at least 95% of the starting charge, as a percentage by weight based on the oxides.

The invention also provides the use of a refractory product in accordance with the invention in a glass furnace, in particular in zones of the furnace in contact with molten glass.

In the present description and as is conventional, the term "zirconia" is applied to molecules of $ZrO_2$ that are not associated with molecules of $SiO_2$ to form zircon. Similarly, the term "silica" is applied to molecules of $SiO_2$ that are not associated with molecules of $ZrO_2$ to form zircon.

Unless otherwise mentioned, all of the percentages are percentages by weight based on the oxides.

The zircon may be provided by zircon sand or chamotte from dense products with a high zircon content.

The composition of the invention, determined by chemical analysis, only provides the overall amounts of $SiO_2$ and $ZrO_2$ without distinguishing the corresponding amounts of zircon.

According to the invention, it is necessary that the starting charge comprises at least 75%, preferably at least 80% zircon. In fact, the advantageous properties of the product of the invention would not be obtained if the quantities of $SiO_2$ and $ZrO_2$ provided by the zircon in accordance with the invention were to be provided in the form of silica and zirconia.

Preferably, the total amounts of zircon and zirconia represent at least 95% of the starting charge.

The starting materials containing zirconia also contain small quantities of $HfO_2$ (1.5% to 2%) and, as is usual, these two oxides are not distinguished from each other.

Zirconia exhibits large dilatometric variations because its crystallographic state changes at high temperature. To limit these dilatometric variations, in particular in large blocks, the zirconia content must be limited. The starting charge must thus contain less than 25% of zirconia, which is ensured with a zircon content of at least 75%.

Preferably, the zirconia in the product of the invention is at least partially stabilized with yttrium oxide, the percentage by weight of stabilized zirconia being more than 10% of the zirconia. To this end, the zirconia must be introduced in a non-stabilized form and the yttrium oxide must be added separately to the starting charge.

Further, as Table 3 below demonstrates, it is important that the zirconia be stabilized by yttrium oxide. Conventional stabilizers for zirconia, such as magnesia or lime, have proved to have a very negative effect on the creep strength of the material.

In accordance with the invention, the presence of yttrium oxide improves the creep strength of the zircon-based refractory product. If zirconia is added to the starting charge, zirconia stabilized with yttrium oxide can be used to supply the yttrium oxide. As explained below, the yttrium oxide is preferably added to the starting charge independently of the zirconia to encourage stabilization, at least in part, of the zirconia in the product of the invention.

However, it is preferable that the yttrium oxide does not stabilize too large a quantity of the zirconia. The yttrium oxide content is thus limited to 3.5%.

The $SiO_2$ content of the product of the invention corresponds to the $SiO_2$ content of the zircon and the free silica. Preferably, at least 1% of silica is added to the starting charge to encourage the initiation of densification at temperatures that are lower than those necessary for the densification of pure zircon.

The total amount of $TiO_2$ is conventionally in the range 0.2% to 1.5% in sintered products with a high zircon content. $TiO_2$ can promote sintering of zircon and encourages the densification of the products during sintering.

The "other oxides" are oxides such as $Na_2O$, $Al_2O_3$, $P_2O_5$ or $Fe_2O_3$. The amounts of $Na_2O$ (which encourages the dissociation of zircon) and $Fe_2O_3$ must be minimized. Supplied by the starting materials, they are not necessary constituents, but are simply tolerated.

The non-limiting examples below are given with the aim of illustrating the invention.

In these examples, the starting materials used were selected from (with the percentages being given as a percentage by weight):

zircon sand containing 66.8% of $ZrO_2+HfO_2$, 32.7% of $SiO_2$, 0.2% of $Al_2O_3$ and 0.1% of $TiO_2$;
zirconia such as CS10 or CC10, sold by Saint-Gobain ZirPro. These products contain at least 98.8% of $ZrO_2+HfO_2$ and 0.1% to 0.5% of $SiO_2$ and have a median particle diameter (D50) of about 3.5 μm [micrometer];
yttriated zirconia containing 92% of $ZrO_2+HfO_2$, 7% of $Y_2O_3$, 0.3% of $Al_2O_3$ and 0.2% of $TiO_2$. The median particle diameter (D50) is about 11 μm;
titanium oxide containing 96.6% of $TiO_2$, 1.7% of $Fe_2O_3$, 0.8% of $SiO_2$ and 0.6% of $Al_2O_3$;
more than 99.9% pure yttrium oxide with a median particle diameter of 3 μm to 4 μm;
phosphoric acid (aqueous 85% $H_3PO_4$ solution);
crystalline silica containing more than 98% $SiO_2$ and with a median diameter of about 10 μm.

Sintered refractory blocks were fabricated using a method conventionally comprising the following steps:

a) optional grinding of the zircon sources;
b) mixing the starting materials to form the starting charge;
c) shaping a green part from said mixture;
d) sintering said green part.

Step a) can produce the conventional granulometric characteristics necessary for good subsequent densification of the material. In the examples described here, the prepared powders have a median diameter (D50) of less than 5 μm.

In step b), all of the starting materials were assayed so that the mixture had the desired mean chemical composition by weight, then mixed in the presence of binder(s) conventionally used in zircon sintering methods, for example phosphoric acid.

The starting materials could optionally be atomized before moving on to step c).

In step c), the mixture was then shaped by isostatic pressing to form blocks of the desired size (100 mm×100 mm×150 mm).

Other techniques such as vibro-casting could be used.

In step d), the shaped part was then sintered in air, at atmosphere pressure and at a temperature in the range 1400° C. to 1700° C., to form a dense refractory block.

Samples were removed from the various blocks to carry out the characterization tests.

In an "isothermal" creep test, a four-point bending test configuration was used (distance between outer points L=110 mm [millimeter], distance between inner points l=40 mm). A bar with dimensions of 25 mm×15 mm×150 mm was placed on those points then its center was subjected to a stress of 2 MPa, the temperature being kept constant and at 1275° C. The variation in the deflection of the bar (in mm) was measured throughout the test. The Df15 and Df90 values for the various test samples were compared, i.e. the percentage deformation after 15 hours and 90 hours respectively.

In the bubble test, the test sample of product constituted a cylindrical crucible with a wall thickness of 5 mm and an inside diameter of 30 mm. This crucible was filled with boro-silico-aluminate type glass. It was then heated to 1350° C. in air for 70 hours. Once the heat treatment was complete, the crucible was cooled then sawed to cut the glass. The glass cut was then observed with the naked eye. The bubble index BI was determined using a scale of 1 (minimum bubbling) to 10 (intense bubbling or foaming), as a function of the number of gas bubbles trapped in the glass after cooling. The bubble index is considered good if it is 5 or less.

To evaluate corrosion resistance, samples with a diameter of 20 mm and length of 100 mm were rotated for 180 hours in boro-silico-aluminate type glass at 1400° C. Once the thermal cycle was complete, the samples were removed from the glass and the volume of the samples was measured and compared with the initial volume. The ratio between the corroded volume of the test sample and the corroded volume of the reference sample multiplied by 100 determined the corrosion index CI.

The composition of the mixture of starting materials is indicated in Table 1 (percentage by weight based on the mixture).

The reference product was product No. 1.

TABLE 1

| No. | Zircon sand (%) | Zirconia (%) | Silica (%) | Titanium oxide (%) | Yttrium oxide (%) | Yttriated zirconia (%) | Phosphoric acid (%) |
|---|---|---|---|---|---|---|---|
| 1 | 84.9 | 12.5 | 1.3 | 1.0 | | | 0.3 |
| 2 | 98.0 | | 1.4 | 0.2 | | | 0.4 |
| 3 | 83.6 | 12.5 | 1.3 | 1.0 | 1.3 | | 0.3 |
| 4 | 83.4 | 12.4 | 1.4 | 1.0 | 1.5 | | 0.3 |
| 5 | 85.0 | | 1.2 | 1.0 | | 12.5 | 0.3 |
| 6 | 95.7 | | 1.3 | 1.1 | 1.5 | | 0.4 |

The mean chemical analysis of the various test products and the test results are given in Table 2 (percentages by weight based on the oxides). The amounts of minor oxides such as $Al_2O_3$, $P_2O_5$, $Fe_2O_3$ etc. do not appear in the table. The total amount of minor oxides was less than 1%.

TABLE 2

| No. | $ZrO_2$ + $HfO_2$ | $SiO_2$ (%) | $TiO_2$ (%) | Additive (%) | Df15 | Df90 | CI | BI | Density (g/cm³) |
|---|---|---|---|---|---|---|---|---|---|
| 1 | 69.2 | 29.1 | 1.1 | | 0.20 | 0.54 | 100 | 2 | 4.30 |
| 2 | 65.4 | 33.4 | 0.3 | | 0.27 | 1.28 | 100 | 3 | 3.90 |
| 3 | 68.3 | 28.6 | 1.1 | 1.3 ($Y_2O_3$) | 0.08 | 0.18 | 100 | 1 | 4.38 |
| 4 | 68.1 | 28.7 | 1.0 | 1.5 ($Y_2O_3$) | 0.02 | 0.04 | 100 | 1 | 4.15 |
| 5 | 68.3 | 29.0 | 1.1 | 0.9 ($Y_2O_3$) | 0.08 | 0.20 | 100 | | |
| 6 | 63.9 | 32.6 | 1.2 | 1.5 ($Y_2O_3$) | 0.09 | 0.16 | 100 | 1 | |
| 7 | 68.7 | 29.1 | 1.0 | 0.35 (MgO) | 0.92 | ND | | | |
| 8 | 68.8 | 29.1 | 1.0 | 0.24 (CaO) | 1.33 | ND | | | |

ND: no data due to excessive deformation and breakage of bars before the end of the creep test.

The examples show that adding yttrium oxide can very significantly reduce deformation due to creep.

Adding yttrium oxide does not degrade the other properties of the material. In fact, the corrosion index is identical to that of the reference product. Further, bubbling is slightly improved with the products of the invention.

Product N° 4 has the best creep strength. A comparison with Example 6 shows that it is preferable to supply zirconia. Preferably, the starting charge comprises at least 5%, preferably at least 10% zirconia.

A comparison of Examples 4 and 5 also shows that it is preferable to provide yttrium oxide in the starting charge in the form which is not associated with zirconia rather than to add yttriated zirconia. Preferably, the starting charge comprises at least 1% yttrium oxide not associated with zirconia (i.e. not acting as a stabilizer for zirconia).

Further, the crystallographic analyses reveal a structure composed of grains of zircon surrounded by an intergranular phase principally comprising zirconia and silica. For the products of the invention, the yttrium oxide combines with zirconia in the intergranular phase and is not drawn into the grains of zircon.

Complementary compression strength tests carried out with the products of Examples 1 and 5 demonstrate the improved behavior of the product of the invention.

Examples 7 and 8 show that the desired result is not obtained with every stabilizer of zirconia, for example magnesia or lime. In fact, such stabilizers have been shown to have a very negative effect on the creep strength of the material.

Clearly, the present invention is not limited to the embodiments described which are provided by way of illustrative examples.

In particular, the product of the invention is not limited to a product fabricated using the method described above. Any known method of fabricating sintered products from zircon would be suitable.

The invention claimed is:

1. A sintered product produced from a starting charge containing 75% to 99% of zircon and having the following mass average chemical composition, as a percentage by weight based on the oxides:

$60\% \leq ZrO_2 + HfO_2 \leq 75\%$;
   $27\% \leq SiO_2 \leq 34\%$;
   $0.2\% \leq TiO_2 \leq 1.5\%$;
   $0.3\% < Y_2O_3 \leq 3.5\%$; and
   other oxides: $\leq 1\%$;
   to a total of 100%.

2. A sintered product according to claim 1, in which the amount of zircon in the starting charge is 80% or more, as a percentage by weight based on the oxides.

3. A sintered product according to claim 1, wherein the starting charge further contains a zirconia content of more than 5% and/or less than 15%, as a percentage by weight based on the oxides.

4. A sintered product according to claim 1, wherein the starting charge further contains a zirconia content of less than 15%, as a percentage by weight based on the oxides.

5. A sintered product according to claim 1, wherein the starting charge further contains a zirconia content of more than 5% and less than 15%, as a percentage by weight based on the oxides.

6. A sintered product according to claim 1, wherein the starting charge further contains zirconia and in which the zirconia is at least partially stabilized by yttrium oxide, the percentage by weight of stabilized zirconia being more than 10% of the zirconia.

7. A sintered product according to claim 1, in which the total amount of yttrium oxide ($Y_2O_3$) is 1.7% or less and/or 0.7% or more, as a percentage by weight based on the oxides.

8. A sintered product according to claim 1, in which the total amount of yttrium oxide ($Y_2O_3$) is 1.7% or less, as a percentage by weight based on the oxides.

9. A sintered product according to claim 1, in which the total amount of yttrium oxide ($Y_2O_3$) is 1.7% or less and 0.7% or more, as a percentage by weight based on the oxides.

10. A sintered product according to claim 1, in which the amount of zircon in the starting charge is 80% or more, as a percentage by weight based on the oxides and having a zirconia content of more than 5%, as a percentage by weight based on the oxides.

11. A sintered product according to claim 1, in which the amount of zircon in the starting charge is 80% or more, as a percentage by weight based on the oxides and having a zirconia content of less than 15%, as a percentage by weight based on the oxides.

12. A sintered product according to claim 1, in which the amount of zircon in the starting charge is 80% or more, as a percentage by weight based on the oxides and in which the total amount of yttrium oxide ($Y_2O_3$) is 0.7% or more, as a percentage by weight based on the oxides.

13. A sintered product according to claim 1, in which the amount of zircon in the starting charge is 80% or more, as a percentage by weight based on the oxides and in which the total amount of yttrium oxide ($Y_2O_3$) is 1.7% or less, as a percentage by weight based on the oxides.

14. A sintered product according to claim 1, in which the amount of zircon in the starting charge is 80% or more, as a percentage by weight based on the oxides, having a zirconia content of more than 5% and less than 15%, as a percentage by weight based on the oxides and, in which the total amount of yttrium oxide ($Y_2O_3$) is 1.7% or less and 0.7% or more, as a percentage by weight based on the oxides.

15. A method of fabricating a sintered product, comprising the following steps:
   a) mixing the starting materials to form a starting charge;
   b) shaping a green part from said starting charge; and
   c) sintering said green part to obtain said sintered product;
   wherein the starting charge is determined so that said product is in accordance with claim 12.

16. A fabrication method according to claim 15, in which monoclinic zirconia is added in step a).

17. A fabrication method according to claim 15, in which in step a), at least 1% of yttrium oxide not associated with zirconia is added.

18. A fabrication method according to claim 15, in which in step a), zircon and optionally zirconia is/are added in quantities such that the total amount of zircon and zirconia represents at least 95% of the starting charge, as a percentage by weight based on the oxides.

19. A fabrication method according to claim 15 in which, in step a), at least 1% of silica is added to the starting charge, as a percentage by weight based on the oxides.

20. A fabrication method according to claim 15, in which in step a), zircon and optionally zirconia is/are added in quantities such that the total amount of zircon and zirconia represents at least 95% of the starting charge, as a percentage by weight based on the oxides and in which, in step a), at least 1% of silica is added to the starting charge, as a percentage by weight based on the oxides.

* * * * *